June 11, 1968 C. P. DE BIASI 3,387,880
RAIL TRANSPORTATION CONTROL SYSTEM
Filed Oct. 22, 1965 3 Sheets-Sheet 1

INVENTOR.
CHARLES P. DE BIASI
BY
ATTORNEY

June 11, 1968     C. P. DE BIASI     3,387,880
RAIL TRANSPORTATION CONTROL SYSTEM
Filed Oct. 22, 1965     3 Sheets-Sheet 3
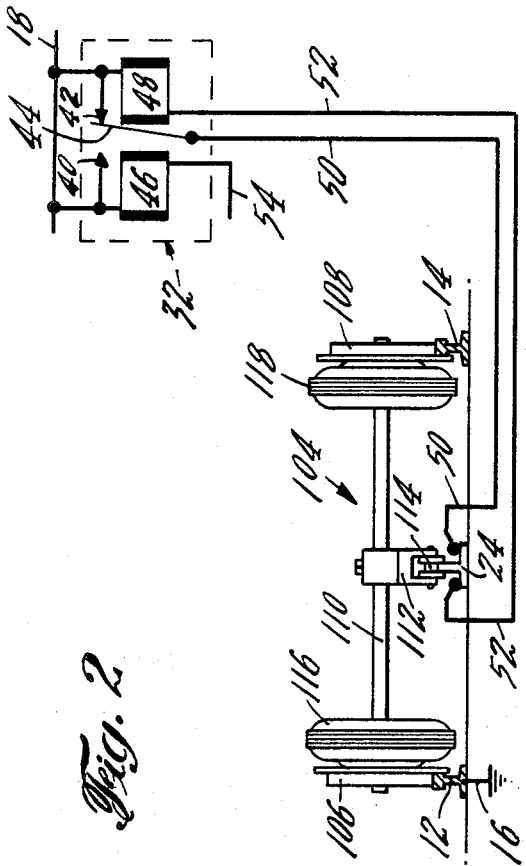
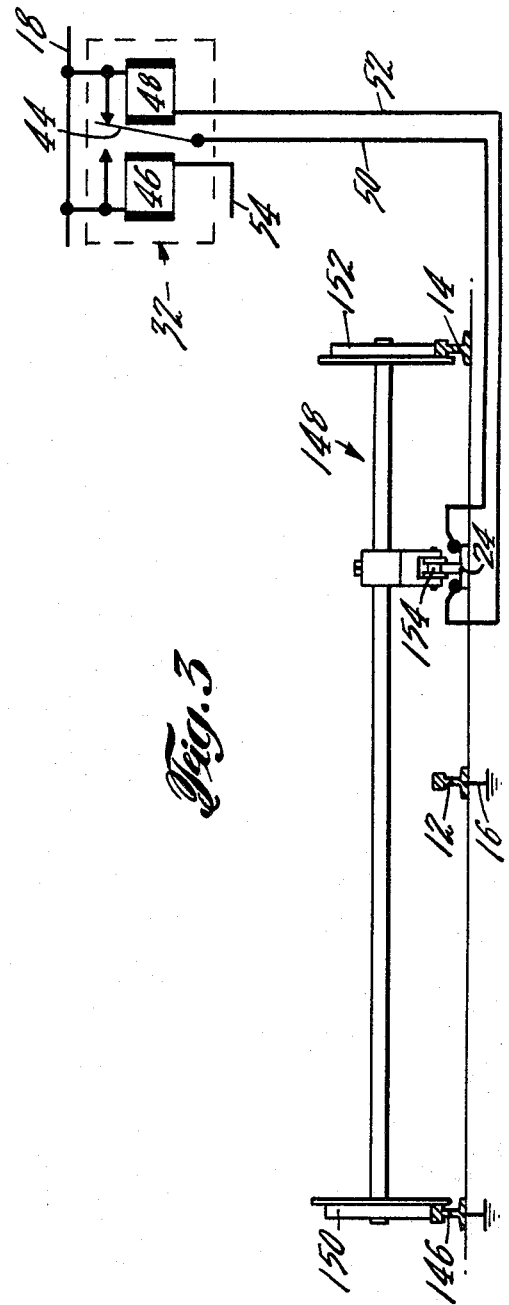
INVENTOR.
CHARLES P. DE BIASI
BY
ATTORNEY United States Patent Office 3,387,880
Patented June 11, 1968

3,387,880
RAIL TRANSPORTATION CONTROL SYSTEM
Charles P. de Biasi, 74 Braman Road,
Waterford, Conn. 06385
Filed Oct. 22, 1965, Ser. No. 501,852
20 Claims. (Cl. 246—31)

ABSTRACT OF THE DISCLOSURE

A system for controlling the speed and spacing of vehicles which travel on rails. A plurality of longitudinally aligned control rails are spaced apart and suitable controls are provided to prevent any two vehicles from approaching each other closer than a distance equal to the length of two of the control rails.

---

The present invention pertains, generally, to a new and improved mass transportation system and, more particularly, relates to a system for guiding and controlling a self-propelled vehicle or vehicles of the type adapted to travel on pavement or rails or equivalent means, which system is particularly constructed and arranged to control said vehicle or vehicles when traveling on rails.

One of the most pressing problems at the present time is the mass surface transportation of people and goods to and from and between major cities. This transportation is presently handled by various types of vehicles which travel on highways or on rails and which are subject to many disadvantages. For example, many conventional railroads have reached or are approaching a state of obsolescence, since they can no longer provide competitive, economical mass transportation, especially in their commuter operations. Some of the major factors contributing to this decline of railroads are the bulk and expense of their equipment and the inability of railroads to transport people and goods directly from their point of origin to their ultimate point of destination.

Large sums of money are now being spent and have been appropriated for the development of high speed superhighways for long distance travel. While the highway designers have striven to develop design criteria directed toward safe driving at increased speeds, manufacturers of highway vehicles, such as cars, buses and trucks, have been designing these vehicles with capabilities beyond both the highway speed designs and the limits of human control. When these latter two factors are combined with the inherent desire of the human being to travel faster, the natural results are, for example, a substantial number of accidents in which a vehicle crosses the median and crashes head-on into traffic in the opposite lane, and chain reaction, rear-end collisions, all created by the driver being lulled into a sense of security which is not incorporated in either the vehicle, the highway or the inherent ability of the driver. The ultimate result, therefore, is a needless loss of human life.

The general purpose of the instant invention is to provide a novel and comprehensive surface transportation system which is safe, fast, economical and, in turn, provides all the services desirable in a mass transportation system. The instant system contemplates the use of vehicles which are constructed and adapted to travel on both pavements and rails, the pavements being used for local or short distance travel and the rails being used for long distance, high speed travel. By limiting high speed travel to rails, the problems of steering and loss of control by skidding, and the like, are substantially eliminated, since the control and attitude of the vehicle become substantially fool-proof functions of gravity and the rails. The only factors remaining to be controlled, therefore, are the speed and the braking of the vehicle, which factors can either be controlled automatically by a suitable electronic device operatively associated with the vehicle or the rails, or can be at least governed by a suitable device or circuit to keep them within certain limits of safety while they are under the control of the operator.

As an illustrative example, the instant transportation system preferably comprises self-propelled vehicles, such as automobiles, buses and trucks, that are equipped to travel both on pavements and rails; wide gauge, ultra high speed vehicles for transporting substantial loads and adapted only for travel on rails over long distances; and, possibly, conventional vehicles intended for travel only on local streets or the like. In accordance with this system, there would be provided two sets of rails for travel in each direction, the center rails preferably being utilized primarily for long distance, high speed travel, and the outer rails being utilized for short distance travel at moderate speeds and also as feeders to the center or high speed rails. At least two lanes of pavement in each direction would be provided to the outside of the rails and utilized for local and short distance travel and also as feeders to the rail system.

Preferably, the vehicles would be self-propelled and thus would be under the control of the operator for local or short distance, low speed travel on pavement. On the rails, however, the speed and predetermined interval between vehicles preferably would be electronically controlled or partially governed through the use of suitable types of governors, warning devices or the like. There would thus be little or no chance of accidents during high speed travel of these vehicles on rails. It is with respect to the high speed travel of such vehicles on rails, in accordance with the general transportation system described above, that the instant invention is specifically directed.

A primary object of the present invention, therefore, is to provide a new and improved system for the surface transportation of vehicles, said system being so constructed and arranged as to be adapted to effectively control the speed, attitude and relation of vehicles traveling at high speeds.

Another primary object of this invention, in addition to the foregoing objects, is to provide a system for the surface transportation of self-propelled vehicles on rails or the like, said system being so constructed and arranged as to be adapted to effectively govern the speed and interval between vehicles.

Yet another primary object of the present invention, in addition to the foregoing objects, is to provide such a system for the rail transportation of self-propelled vehicles wherein the operator may selectively maintain the vehicle under his control or choose to have the vehicle controlled or partially governed by said system.

Still another primary object of this invention, in addition to the foregoing objects, is to provide a new and improved system for the surface transportation of self-propelled vehicles, said system being so constructed and arranged as to comprise a plurality of separate electrical control circuits which are adapted to individually and successively control or partially govern the travel of the vehicle in response to predetermined safety conditions.

A further primary object of the present invention, in adddition to the foregoing objects, is to provide such a system for the surface transportation of self-propelled vehicles which is so constructed and arranged as to automatically prevent a moving vehicle from maintaining its speed, or accelerating when it is less than a predetermined distance from a preceding vehicle.

A still further primary object of the present invention, in addition to the foregoing objects, is to provide such a system for the surface transportation of self-propelled vehicles, said system being so constructed and arranged as to effect a reduction in vehicle speed and to effectively warn the operator when his vehicle is within a predetermined distance of a preceding vehicle, to thereby enable the operator to brake his vehicle within a sufficient braking distance and to avoid a rear end collision with the preceding vehicle.

Furthermore, it is a primary object of this invention, in addition to the foregoing objects, to provide a new and improved system for the rail transportation of self-propelled vehicles of the type adapted to travel on both pavement and rails, said system being so constructed and arranged as to be adapted to either control the speed and relative positions of vehicles, or to guide and warn or guide or warn the vehicle operators during the operation of the vehicles to contribute to the safe operation thereof.

An additional primary object of the present invention, in addition to the foregoing objects, is the provision of such a system for the rail transportation of self-propelled vehicles which is so constructed and arranged as to enable the operator to manually select a predetermined or desired speed of his vehicle, which speed will be maintained and controlled by said system as long as conditions of safety permit.

Other objects and important features of the invention will be apparent from a study of the specification following taken with the drawings, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the sub-joined claims.

In the drawings:

FIGURE 2 is a diagrammatic view taken substantially along line 2—2 of FIGURE 1; and FIGURE 3 is a view similar to FIGURE 2, showing a modified form of the instant invention.

Figure 1:
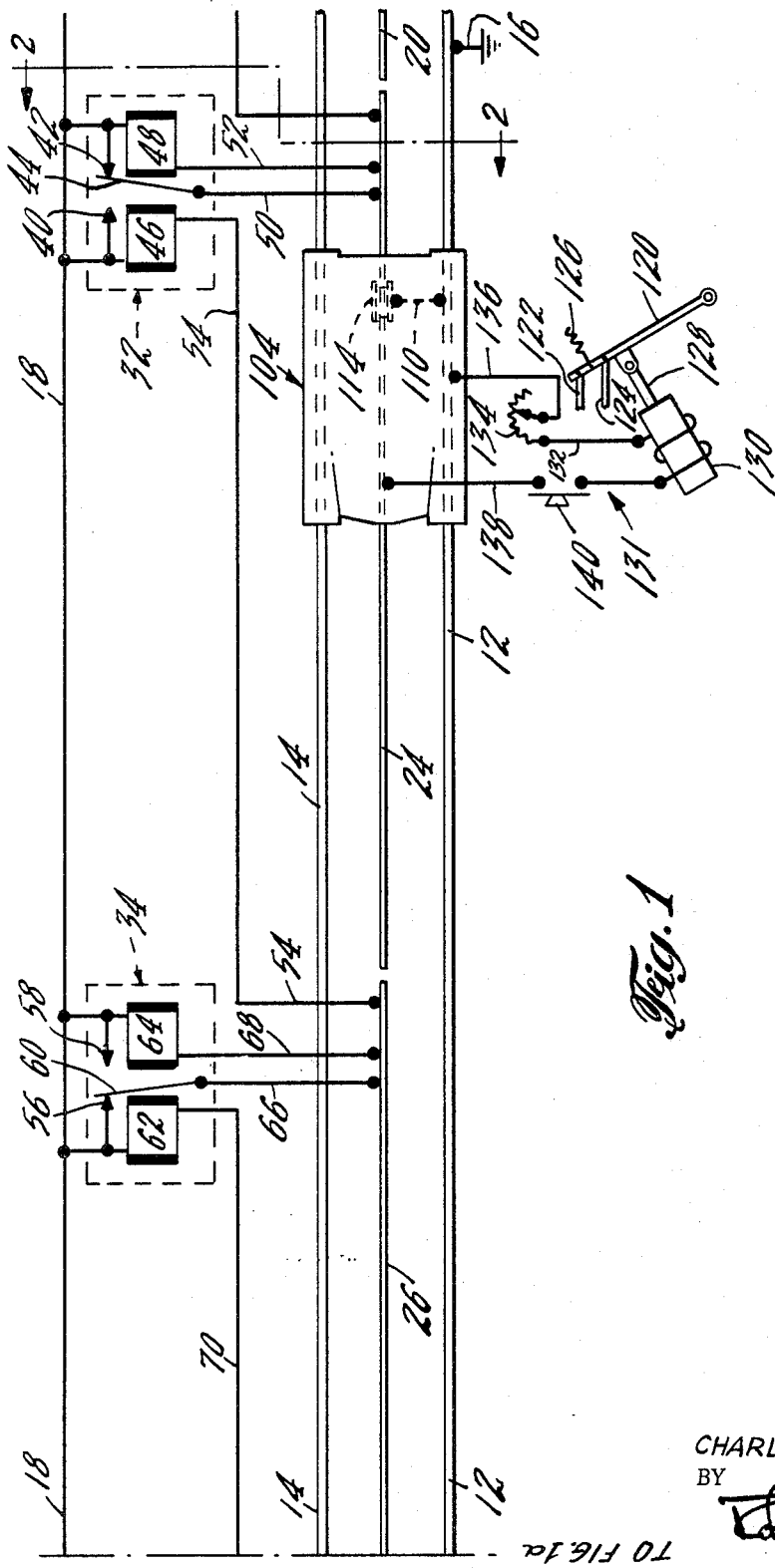
FIGURES 1 and 1a are each a diagrammatic representation of a rail transportation system for self-propelled vehicles constructed in accordance with the principles of the present invention.
Figure 1A:
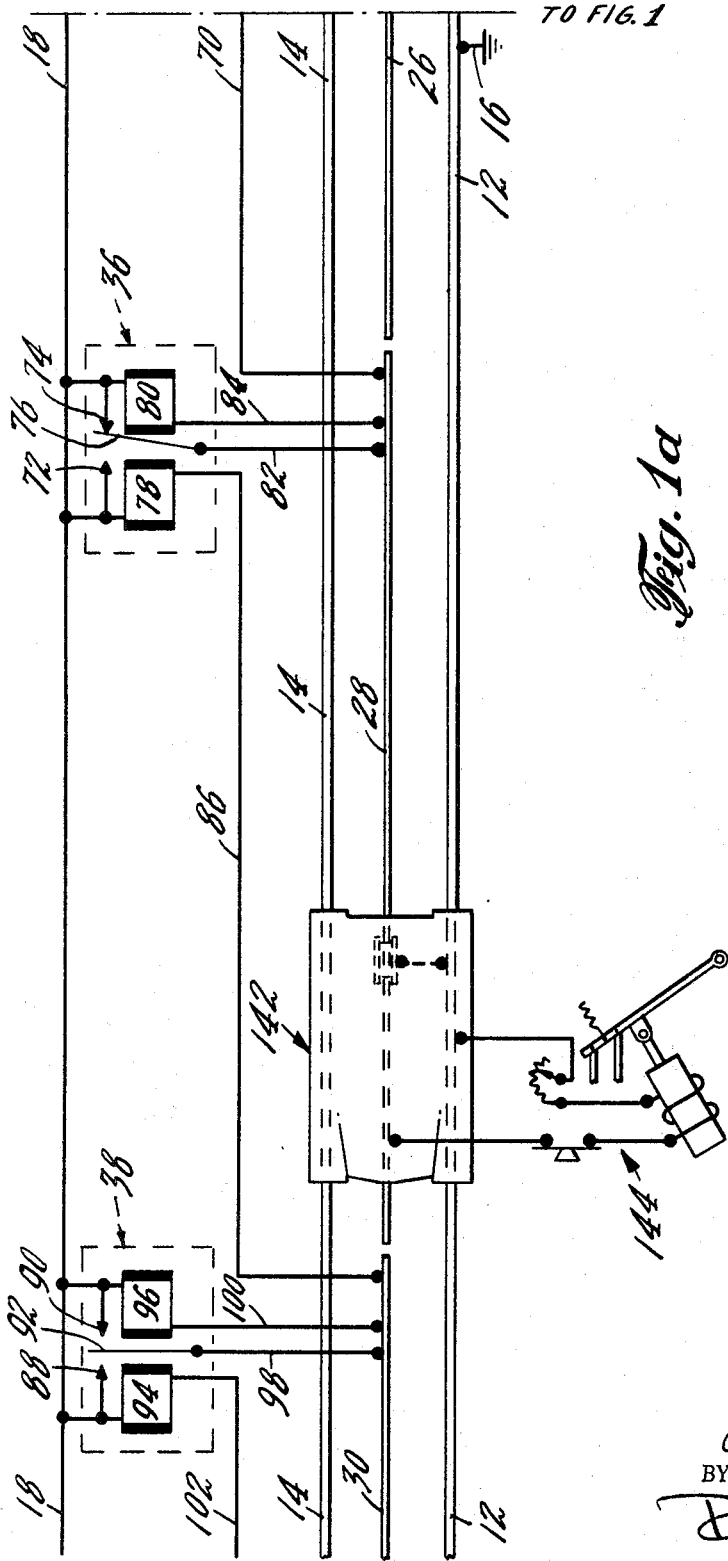

With reference now to the drawings, and particularly FIGURES 1 and 1a, there is illustrated therein a system 10 for controlling the movement of self-propelled vehicles on rails or equivalent means. The system 10 comprises a pair of parallel rails 12 and 14, the rail 12 being grounded at 16 and forming a main conductor of a low amperage control circuit incorporating another main conductor 18. The conductor rail 12 and the conductor 18 are connected in any suitable manner to a suitable power source (not shown). Disposed between the rails 12 and 14 and extending generally parallel therewith, are a plurality of longitudinally aligned and spaced control rails 20, 24, 26, 28 and 30. Each of these control rails 20 through 30 are longitudinally spaced a predetermined distance, the significance of which will be more fully described hereinafter.

A plurality of solenoid operated switching mechanisms 32, 34, 36 and 38 are electrically connected in a manner to hereinafter be described between the main conductor 18 and the control rails 20 through 30. These switching mechanisms 32 through 38 preferably are identical and may be of any suitable construction so as to operate in the manner described herein. As an illustrative example, the switching mechanism 32 comprises a pair of contacts 40, 42; an armature 44 adapted for movement between the contacts 40, 42; and suitable means (not shown) for normally maintaining the armature 44 in an open position between the contacts 40, 42. Connected to the main conductor 18 and disposed on either side of the armature 44 are a pair of solenoids 46 and 48 of conventional construction which, when energized, serve to attract the armature 44 into contact with the respective contact 40 or 42. The armature 44 and the solenoid 48 are connected to the control rail 24 by conductors 50 and 52, respectively. The solenoid 46 of switch 32 is connected to the preceding control rail 26 by a conductor 54 for a purpose hereinafter to be described.

The switching mechanism 34 is of the same constructions and is connected to the control rails 26 and 28 in the same manner that the previously described switching mechanism 32 is connected to the control rails 24 and 26. Similarly, the switching mechanisms 36 and 38 are connected to the control rails 28, 30, and to the rail 30 and the preceding rail (not shown), respectively, in the same manner that the switching mechanism 32 is connected to the control rails 24 and 26. The numerals 56 through 102 are utilized in FIGURES 1 and 1a to designate the component parts of the switching mechanisms 34 through 38 and the conductors for connecting these switching mechanisms to the control rails 26 through 30. Since the switching mechanisms 34 through 38 are identical in construction, and in the manner in which they are connected to the control rails, as that of the switching mechanism 32, the construction of these switching mechanisms 34 through 38 is believed to be apparent and, thus, is not specifically described herein.

Referring to FIGURES 1, 1a and 2, a vehicle 104 adapted for travel on the rails 12 and 14 of the instant system is provided with a pair of flanged wheels 106 and 108 of any suitable construction which are adapted for travel and retention on the rails 12 and 14 (see FIGURE 2). The flanged wheels 106, 108 are mounted on an axle 110 which is provided with a downwardly extending bracket 112 on which a flanged contact roller 114 is rotatably mounted. The contact roller 114 is positioned to contact and to be retained on each of the control rails 20 through 30 when the vehicle is traveling on the rails 12 and 14. The vehicle 104 is of the self-propelled type and preferably is driven and braked by and through a suitable hydraulic transmission system.

The vehicle 104 preferably is also provided with a pair of pneumatic or other type wheels or tires 116, 118 which extend below the flanged wheels 106, 108 and are adapted for travel on pavement (see FIGURE 2). The flanged wheels 106, 108 and the pavement wheels 116, 118 preferably either incorporate or are driven by fluid motors (not shown) which are adapted to be hydraulically driven and which are constructed in accordance with my co-pending application Ser. No. 556,489, filed June 9, 1966, and entitled Auto Kinetic Wheel or Fluid Motor.

While the construction and operation of the self-propelled vehicle 104 has been described above with reference to the specifically identified co-pending application, it is not intended that such references be limiting on the scope of this invention. It is noted that for the purpose of the present invention, the vehicle 104 may be of any other suitable or conventional type or construction, provided it is self-propelling and is adapted to travel on rails or equivalent means.

By way of illustration and not limitation, and as shown in FIGURE 1, the vehicle 104 comprises a pivoted foot pedal 120, comparable to the conventional accelerator pedal, which preferably is connected by suitable linkages 122 and 124 to a prime mover (not shown) and a pump (not shown), respectively, for driving the vehicle. A spring 126 or any other suitable means is provided for normally maintaining the foot pedal 120 in a predetermined neutral position. The foot pedal 120 is connected in any suitable manner to the plunger 128 of a solenoid 130 which is incorporated in a secondary vehicle circuit 131. One end of the solenoid winding is electrically connected by a conductor 132 to a rheostat 134 of any suitable construction which, in turn, is connected to the conductor rail 12 through a suitable conducting means 136 in the vehicle. The other end of the solenoid winding is connected to the adjacent control rail 24 through a suitable conductor 138 in the vehicle, the conductor 138 incorporating an on-off switch 140 of any suitable construction and preferably similar to the conventional ignition switch in a vehicle. The secondary circuit 131 in the vehicle 104, when energized or completed, serves to maintain the foot pedal 120 in a predetermined driving condition through the attraction of the plunger 128 by the energized solenoid coil 130, which is a function of the setting of the rheostat 134, in a manner which will be readily apparent from the description hereinafter.

In the operation of the vehicle 104 adapted for travel on both pavement and rails, and in accordance with the surface transportation system described above, it is assumed that the vehicle 104 has been driven under the control of the operator from a feeder pavement road onto the instant rails 12 and 14 and is in the position shown in FIGURE 1. It is also assumed that at this point the operator is in the process of accelerating the vehicle 104 to a desired or predetermned speed which, for example, is dictated by the safety factors of the instant system. When the vehicle 104 is in the position shown in FIGURE 1, and as specifically shown in FIGURE 2, the contact roller 114 of the vehicle is in engagement with the control rail 24 to thereby close a circuit between the conductor rail 12 and the other main conductor 18 through the flanged vehicle wheel 106, the axle 110, the bracket 112 and the contact wheel 114, all of which are electrically connected in any suitable manner, and then through the conductor 52 and the solenoid 48. The energization of the solenoid 48 attracts the armature 44 of the switching mechanism 32 into engagement with the contact 42 to thereby complete the circuit back to the control rail 24 via the conductor 50. A low amperage control circuit is thus closed between the conductor rail 12 and the main conductor 18 through the vehicle and the control rail 24.

Thereafter, when the vehicle 104 reaches the predetermined or desired ultimate speed, which may be automatically or electronically fed into the secondary circuit 131 or manually set on the rheostat 134 by the operator, the switch 140 of the secondary circuit 131 is manually closed to thereby energize the solenoid 130 and to attract the solenoid plunger 128 and thus the foot pedal 120 to a predetermined position corresponding to the desired speed of the vehicle. In this condition, therefore, the vehicle 104 will travel along the rails 12, 14 at the constant predetermined speed in a continuous manner, without requiring any further action on the part of the operator. It is noted that, for the purpose of insuring the smooth continuous operation of the vehicle, the longitudinal spacing between the control rails 20 through 30 is less than the portion of the circumference of the contact wheel 114 in engagement with the control rails, so that the wheel 114 is in constant contact with one of the control rails 20 through 30 while the vehicle 104 is traveling on the rails 12, 14. It is further noted that the end construction, relationship and spacing of the third rails in order to provide for continuous operation of the vehicle may be accomplished in any other suitable manner.

Although the vehicle 104 is now traveling at the constant predetermined speed along the rails 12, 14, the operator may still control the speed of the vehicle by braking it in any suitable manner, or by re-setting the rheostat 134 of the secondary vehicle circuit 131 if it is of the manually operable type. In addition, by opening the switch 140 to thus break the secondary control circuit 131, the operator can bring the vehicle completely under his own control and can operate it on the rails 12, 14 in the same manner as the operation thereof on pavement. The operator thus can override the instant rail transportation system when it is deemed necessary or desirable.

As shown in FIGURE 1a, it is assumed that a second vehicle 142, identical in construction and operation to the vehicle 104, is traveling on the rails 12, 14 in front of the vehicle 104 and is in contact with the control rail 28 to thereby close a circuit through the solenoid 80 of the switching mechanism 36 and cause the armature 76 to engage the contact 74 in the same manner as that disclosed above with respect to the vehicle 104 and the switching mechanism 32. It is further assumed that the vehicle 142 is traveling at a predetermined constant speed under the control of its secondary circuit 144 which is identical in construction and operation to the circuit by the vehicle 104 between the conductor rail 12 and the other main conductor 18, and through the control rail 28, also energizes the solenoid 62 of the preceding switching mechanism 34, since the solenoid 62 is connected to the control rail 28 by the conductor 70. This energization of the solenoid 62 attracts the armature 60 of switching mechanism 34 into engagement with the contact 56 and thus prevents the armature 60 from engaging the other contact 58 and from closing a circuit through the control rail 26. The armature 60, therefore, is locked in this position and prevented from closing a circuit through the third rail 26 as long as the vehicle 142 is in contact with the control rail 28.

Referring now to FIGURES 1 and 1a, if the vehicle 104 were to contact the control rail 26 while the preceding vehicle 142 is still in contact with the control rail 28, the control circuit across the control rail 26 and between the conductor rail 12 and main conductor 18 could not be completed for the reasons described above. The secondary circuit 131 also would be open and thus would not serve to retain the foot pedal 120 in the depressed position corresponding to the desired speed. The spring 126, therefore, returns the foot pedal 120 to its neutral or idling position and the vehicle 104 begins to decelerate. It is believed to be apparent from the above description that the control circuit of the instant system, which serves to maintain the vehicle at a predetermined speed either manually selected by the operator or automatically selected by the system, will be broken as to a vehicle when it contacts a control rail adjacent to and behind a control rail having another vehicle in contact therewith. This safety feature of the instant system results from the connecting of one solenoid of each of the switch mechanisms 32 through 38 to an adjacent control rail and the other solenoid thereof to the next preceding rail in the direction of travel, as hereinbefore described in detail.

Preferably, the length of each of the control rails 20 through 30 of the instant system is sufficient to enable safe braking of the vehicle by the operator within a distance equivalent to the length of one of the control rails, thereby lessening the possibility of a rear end collision between two vehicles in the relationship of the vehicles 104 and 142 in FIGURES 1 and 1a. The secondary control circuit of each of the vehicles, for example, could be provided with a suitable warning device (not shown) such as a horn, buzzer or light, to indicate to the operator that the control circuit has been broken and that the vehicle should be braked, owing to the presence of another vehicle within a predetermined distance ahead.

Additionally, the instant system could be provided with suitable means (not shown) for indicating or automatically responding to a power failure or malfunction in the system, and the system and vehicles could be adapted to effect automaic braking of the vehicles under predetermined conditions.

FIGURE 3 illustrates a modified form of the instant rail transportation system for use with vehicles of normal width adapted to travel both on pavement and rails, in accordance with the above description, and vehicles of a wider gauge adapted to travel only on rails and capable of carrying substantial quantities of goods or people or both over long distances. In accordance with this modification, a grounded rail 146 is provided in addition to the rails 12 and 14 described above. The rail 146 is intended for use with the non-energized rail 14 for guiding and supporting a vehicle 148 of wide gauge and having only flanged wheels 150 and 152. The vehicle 148 preferably is of the self-propelled type and is substantially the same in operation as the vehicles 104 and 142. The contact roller 154 of the vehicle 148 is adapted to contact the control rails 20 through 30 and thus is controllable by the control circuit of the instant system in a manner the same as or similar to that disclosed above. The purpose of the wide gauge vehicle 148 is for the long distance transportation of substantial quantities of goods, people and other smaller vehicles at high speed and increased efficiency.

While the invention has been shown, illustrated, described and disclosed in terms of embodiments or modifications which it has assumed in practice, the scope of the invention should not be deemed limited by the precise embodiments or modifications herein shown, illustrated, described and disclosed, such other embodiments or modifications intended to be reserved especially as they fall within the scope of the claims appended hereto.

What is claimed is:

1. A system for controlling the travel of self-propelled vehicles of the type adapted to travel on rails and pavements, said system comprising:
   a pair of parallel rails on which said vehicles are adapted to travel;
   a low amperage control circuit comprising a first conductor and one of said rails as a second conductor;
   a plurality of longitudinally aligned and spaced control rails which are disposed between and in parallel relation to said pair of rails;
   a plurality of switching mechanisms electrically connected between said first conductor of said control circuit and said control rails;
   each of said switching mechanism comprising:
   a pair of spaced contacts connected to said first conductor;
   a movable armature adapted to engage one or the other of said contacts and normally disposed in an open position between and out of engagement with said contacts, said armature being connected to the adjacent control rail;
   a pair of solenoids disposed on either side of said armature, one of said solenoids being connected to one of said contacts and to the ajdacent control rail, and the other of said solenoids being connected to the other said contacts and to the control rail preceding said adjacent control rail in the direction of travel;
   each of said vehicles comprising:
   a contact roller adapted to continuously engage said control rails as said vehicle travels on said pair of rails;
   a pair of flanged wheels adapted for travel on said pair of rails and a second pair of wheels adapted for travel on pavement, said flanged wheels being electrically connected to said contact roller to enable said control circuit to be closed across the respective control rail with which said roller is in contact to thereby energize the solenoid of the respective switching mechanism connected to said respective control rail and to attract the armature of said switching mechanism into engagement with the contact connected to said respective solenoid;
   a foot pedal operatively associated with the propelling means of said vehicle;
   a secondary circuit adapted to be connected to said control circuit through said respective control rail in contact with said vehicle roller, said secondary circuit comprising:
   a solenoid plunger operatively associated with said foot pedal;
   a solenoid coil surrounding said plunger;
   an open-close switch connected to one end of said solenoid coil; and
   a rheostat connected to the other end of said solenoid coil to condition said solenoid coil and to control the position of said solenoid plunger and thus said foot pedal.

2. The system as recited in claim 1, further comprising:
   an additional conductor rail connected into said control circuit and being disposed in spaced relation to and on the opposite side of said second conductor rail from the other of said pair of rails to provide with the latter a wide gauge pair of rails adapted to guide and support wide gauge vehicles for carrying substantial loads.

3. The system as recited in claim 1, wherein:
   the solenoids of said switching mechanisms are so constructed and arranged as to be capable of moving said armature from the open position to a position in engagement with the contact associated with each of the solenoids and incapable of moving said armature from engagement with the other of said contacts.

4. A system for controlling the travel of self-propelled vehicles of the type adapted to travel on rails, said system comprising:
   a pair of parallel rails;
   a control circuit comprising a first conductor and one of said rails as a second conductor;
   a plurality of longitudinally aligned and spaced control rails disposed between and in parallel relation to said pair of rails;
   a plurality of switching mechanisms electrically connected between said first conductor of said control circuit and said control rails, each of said switching mechanisms being connected to a pair of adjacent control rails and adapted to close said control circuit across one or the other of said pair of adjacent control rails;
   each of said vehicles comprising:
   a pair of wheels adapted for travel on said pair of rails;
   means electrically connected to one of said wheels and adapted to continuously engage said control rails as said vehicle travels on said pair of rails to thereby enable said control circuit to be completed across the control rail in contact therewith and one of said switching mechanisms connected to said control rail;
   a foot pedal operatively associated with the propelling means for said vehicle; and
   a secondary circuit adapted to be connected to said control circuit and operatively associated with said foot pedal to thus control the position of said foot pedal and thus the speed of said vehicle.

5. The system as recited in claim 4, wherein said switching mechanisms each comprise:
   a movable armature disposed in normally open position; and
   a pair of solenoids on either side of said armature and adapted to attract said armature to close said control circuit to one or the other of said pair of adjacent control rails.

6. The system as recited in claim 4, wherein:
   said vehicle foot pedal is provided with means for normally returning it to its neutral or idling position, and wherein:
   said secondary circuit comprises means operatively associated with said foot pedal for retaining it in a predetermined position, and manually operable means connected to said positioning means for conditioning the latter.

7. A system for controlling the travel of self-propelled vehicles comprising:
   elongated parallel guide means on which said vehicles are adapted to travel;
   a control circuit comprising a first conductor and one of said guide means;
   a plurality of aligned and spaced elongated contact means disposed in parallel relation to said guide means;

switching means electrically connected between said first conductor of said control circuit and said elongated contact means;

said switching means being adapted to close said control circuit across one or the other of a pair of adjacent contact means connected thereto;

each of said vehicles comprising:
means for engaging said contact means when said vehicle is disposed on said guide means; and
means adapted to be electrically connected to said engaging means to enable said control circuit to be utilized for controlling said vehicle.

8. A system for controlling the travel of self-propelled vehicles, comprising:
means for guiding and supporting the vehicles;
a control circuit connected to said guiding and supporting means;
a plurality of spaced contact means disposed adjacent to said guiding and supporting means and in alignment in the direction of travel; and
means connected to said contact means and to said control circuit and adapted to close said control circuit across one or the other of adjacent contact means;
said vehicles each having means for engaging said contact means to enable said control circuit to govern said vehicle.

9. The system as recited in claim 8, wherein:
said guiding and supporting means comprises a pair of parallel rails; and
said control circuit comprises one of said rails as a conductor.

10. The system as recited in claim 9, wherein:
said contact means comprises a plurality of longitudinally aligned control rails disposed between and in parallel relation to said pair of rails.

11. The system as recited in claim 10, wherein:
said means adapted to closed said control circuit comprises a plurality of switches of the normally open, double throw type;
said switches each having a pair of actuating means;
one of said actuating means being connected to one of a pair of adjacent control rails, and the other of said actuating means being connected to the other of said pair of adjacent control rails.

12. The system as recited in claim 11, wherein said vehicles each comprise:
a pair of wheels adapted for travel on said pair of rails, one of said wheels being electrically connected to said engaging means;
manually operable means for controlling the propulsion of said vehicle; and
a secondary circuit operatively associated with said manually operable means and being adapted to be connected to said control circuit to thereby control the position of said manually operable means.

13. The system as recited in claim 8, wherein:
said means adapted to close said control circuit comprises a plurality of switches, each of which is normally open and is provided with actuating means connected to a pair of adjacent contact means.

14. The system as recited in claim 8, wherein:
said vehicles are each provided with manually operable means for controlling the propulsion thereof; and
a secondary circuit operatively associated with said manually operable means and said engaging means for controlling the position thereof.

15. A vehicle control system, comprising:
elongated means for guiding and supporting vehicles;

a control circuit connected to said guiding and supporting means;

a plurality of elongated vehicle contact means disposed adjacent to said guiding and supporting means and in alignment in the direction of travel; and switch means connected to said contact means and to said control circuit and adapted to close said control circuit through one or the other of a pair of adjacent contact means.

16. A system for controlling the spacing between two self-propelled vehicles of the type adapted to travel on rails, the system comprising:
a pair of parallel rails for supporting the vehicles;
a control circuit comprising:
 a conductor;
 a plurality of longitudinally aligned and spaced apart control rails in parallel to the pair of rails;
 a plurality of switching mechanisms electrically connected between the conductor and the plurality of control rails;
each of the switching mechanisms comprising:
 first means connected to a first control rail for closing the control across the first control rail when the first vehicle is in contact therewith; and
 second means for preventing the closing of the control circuit across the first control rail when the second vehicle is in contact with a second control rail spaced from the first control rail;
each of the vehicles comprising:
 a pair of wheels engaging the pair of rails;
 means for continuously engaging the control rails as the vehicle travels on the pair of rails to enable the control circuit to be completed across the control rail in contact with the vehicle and the switching mechanism associated therewith; and
 means for controlling the deceleration of the vehicle in response to the opening of the control circuit.

17. The system of claim 16 wherein:
the switching mechanism comprises a contact and a movable armature for engagement with the contact;
the first means comprises a first solenoid in communication with the conductor and the first control rail for moving the armature into engagement with the contact when the first vehicle is in engagement with the first control rail; and
the second means comprises a second solenoid in communication with the second control rail and the conductor for maintaining the armature out of engagement with the contact when the second vehicle is in engagement with the second control rail.

18. The system of claim 17, wherein the first control rail is immediately adjacent the second control rail.

19. The system of claim 16, wherein the deceleration control means comprises:
a foot pedal operatively associated with the propelling means of the vehicle;
a second control circuit connected to the control circuit when the control circuit is closed for controlling the position of the foot pedal.

20. The system of claim 16, wherein the control circuit comprises as a second conductor one of the pair of of rails.

References Cited

UNITED STATES PATENTS

| | | |
|---|---|---|
| 841,607 | 1/1907 | Adams. |
| 2,661,070 | 12/1953 | Ferril _____ 180—77 |

ARTHUR L. LA POINT, *Primary Examiner.*

H. BELTRAN, *Assistant Examiner.*